United States Patent [19]

Radek

[11] 4,216,728
[45] Aug. 12, 1980

[54] DOCUMENT STORAGE DEVICES FOR SERVICE TRUCK

[75] Inventor: John R. Radek, Hinsdale, Ill.

[73] Assignee: Ready Metal Manufacturing Company, Chicago, Ill.

[21] Appl. No.: 824,640

[22] Filed: Aug. 15, 1977

Related U.S. Application Data

[62] Division of Ser. No. 632,625, Nov. 17, 1975, Pat. No. 4,056,194, which is a division of Ser. No. 418,835, Nov. 26, 1973, Pat. No. 3,957,159, which is a division of Ser. No. 240,163, Mar. 31, 1972, Pat. No. 3,807,788.

[51] Int. Cl.³ .................. A47B 41/04; A47B 23/00
[52] U.S. Cl. ............................ 108/44; 108/28; 296/37.1
[58] Field of Search .............. 108/44, 45, 28, 48, 108/42; 312/233, 189, 183, 245; 297/192; 248/455, 456; 296/37.1, 37.6, 1 R

[56] References Cited

U.S. PATENT DOCUMENTS

| | | | |
|---|---|---|---|
| 355,219 | 12/1886 | Schlicht | 312/189 |
| 1,796,496 | 3/1931 | Volkmar | 312/233 |
| 2,364,479 | 12/1944 | Schroder | 312/183 |
| 2,792,267 | 5/1957 | Hubbard | 108/45 |
| 2,799,967 | 7/1957 | Molinari | 108/45 |
| 2,867,484 | 1/1959 | Jennings | 108/48 X |
| 2,898,170 | 8/1959 | Antonius | 108/45 |
| 3,584,915 | 6/1971 | Meyers, Jr. | 297/192 |
| 3,946,678 | 3/1976 | Birge et al. | 108/44 |
| 4,044,694 | 8/1977 | Wylie | 108/28 |

*Primary Examiner*—James T. McCall
*Attorney, Agent, or Firm*—Frank H. Marks

[57] ABSTRACT

Document storage equipment to be housed in the forward driver compartment of a service van, separated by a bulkhead from a rear compartment carrying parts, supplies and tools required for service calls. Said document storage equipment comprises a shelf or table for supporting documentary materials such as orders, service manuals, records and the like to facilitate the operations of a service man. Said shelf is disposed for ready access adjacent the driver's position, having a free outer end and an inner end adjacent to and supported by the bulkhead. Said shelf is provided with a diagonal strut supporting the shelf from the floor and engaging the shelf at a point remote from the bulkhead, allowing space under the shelf for mounting additional document support means. The means securing the shelf to the bulkhead, and strut to floor, are preferably quick-detachable devices.

3 Claims, 12 Drawing Figures

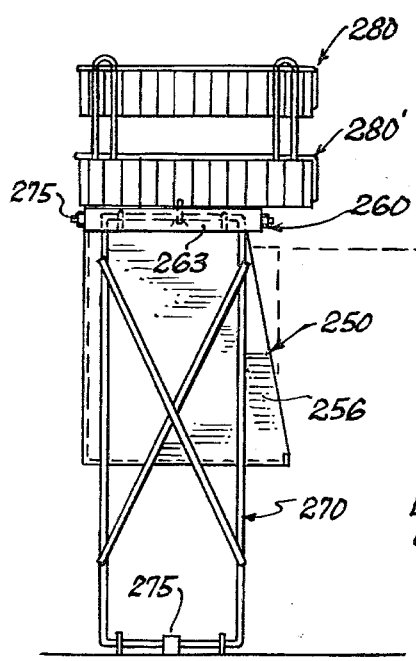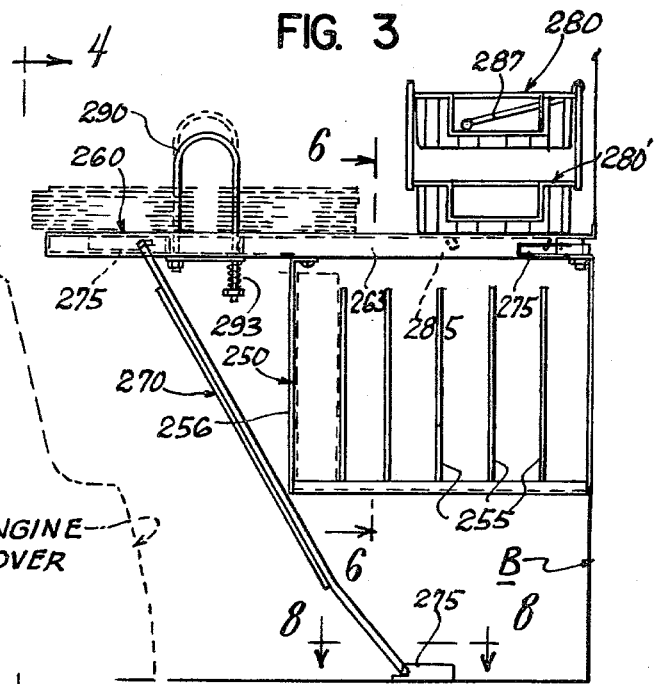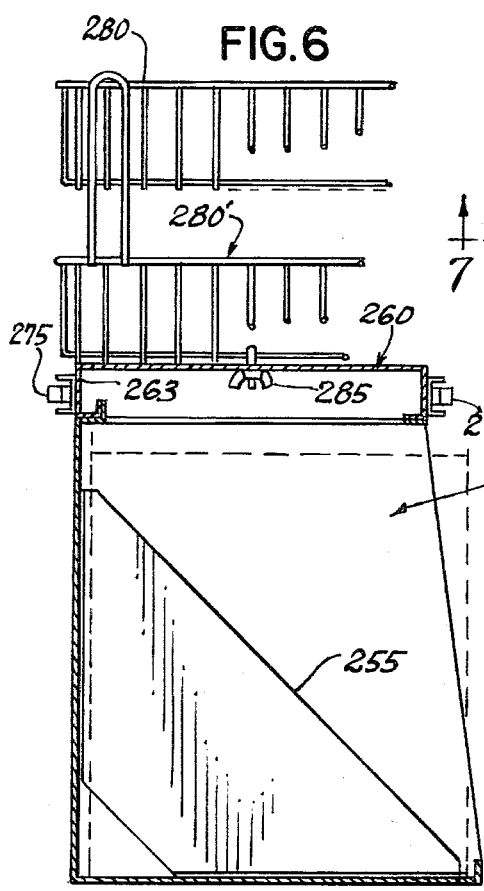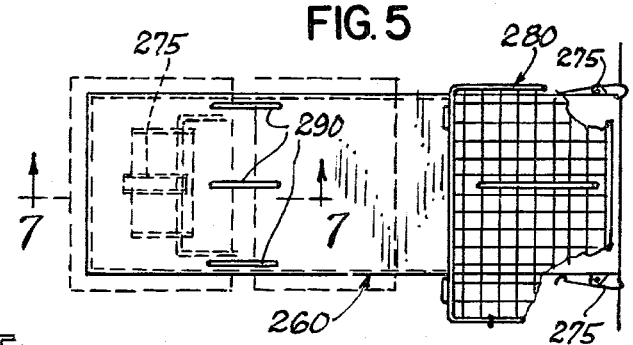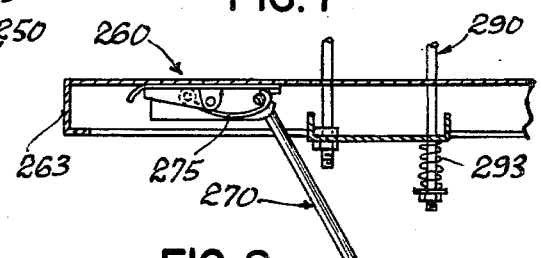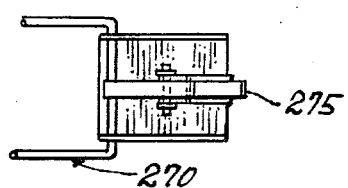

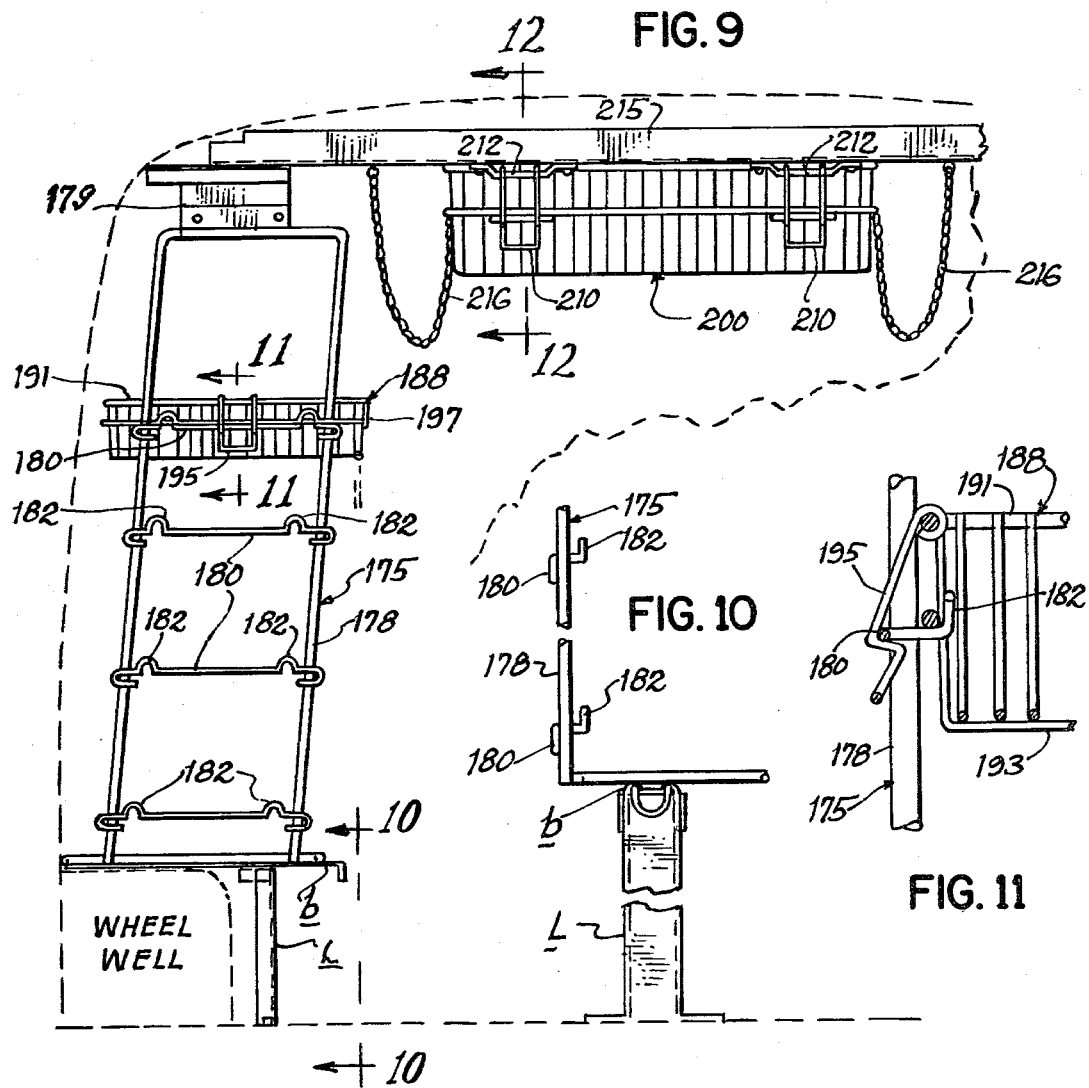

DOCUMENT STORAGE DEVICES FOR SERVICE TRUCK

This application is a division of my copending application Ser. No. 632,625, filed Nov. 17, 1975, now U.S. Pat. No. 4,056,194, which in turn is a division of Ser. No. 418,835 filed Nov. 26, 1973, my U.S. Pat. No. 3,957,159 issued May 18, 1976; the latter in turn is a division of Ser. No. 240,163 filed Mar. 31, 1972, my U.S. Pat. No. 3,807,788 issued Apr. 30, 1975.

My primary invention relates to a service van for repair and servicemen with a variety of equipment and supplies disposed therein to house and dispense materials needed by the servicemen in his calls, so as to be readily accessible with a minimum expenditure of time and effort.

The present divisional application relates to certain storage devices required by the serviceman, particularly documentary material and other articles, mounted within the van.

BACKGROUND

According to the prior art within my knowledge, a serviceman was required to carry certain documentary material such as service manuels, parts lists, orders, instructions, etc., as well as parts, tools, etc. In the past such materials were carried in a more or less disorganized manner in the van, requiring considerable loss of time and effort in service calls.

BRIEF OUTLINE OF INVENTION

According to my invention document housing equipment is disposed in the cab, organized and arranged for quick access, and containers for tools, parts etc., are mounted in the truck body in such manner as to be maintained in orderly condition despite the jostling of travel.

Another object is to mount my improved document supporting equipment in the cab, occupying a minimum of space without restricting the freedom of the driver-serviceman while within easy reach.

Reticulated wire containers are preferable for high visibility from outside the containers and also for low cost.

Various other objects and advantages will become apparent to those skilled in the art as the description proceeds.

BRIEF DESCRIPTION OF DRAWINGS

Referring now to the drawings forming part of this specification and illustrating certain preferred embodiments.

FIG. 3 is a side elevation of document supporting means disposed within the cab portion of the van;

FIG. 4 is an end elevation seen along line 4—4 of FIG. 3;

FIG. 5 is a top plan view of the equipment seen in FIG. 3;

FIG. 6 is a sectional view along line 6—6 of FIG. 3;

FIG. 7 is an enlarged section along line 7—7 of FIG. 5;

FIG. 8 is an enlarged plan detailing a floor attachment as seen along line 8—8 of FIG. 3;

FIG. 9 is an elevational view on an enlarged scale of a portion of the storage compartment of the truck body, showing certain storage equipment;

FIG. 10 is an enlarged fragmentary elevation seen along line 10—10 of FIG. 9;

FIG. 11 is a similar view seen along line 11—11 of FIG. 9, and

FIG. 12 is an enlarged fragmentary section-elevation taken along line 12—12 of FIG. 9.

DETAILED DESCRIPTION

Figure 1:
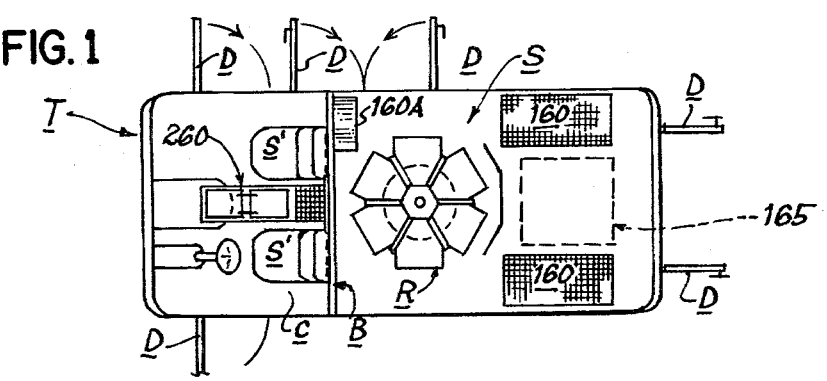
FIG. 1 is a schematic top plan view of a fitted truck body in a preferred embodiment of my invention, designed to house my improved storage devices.
Figure 2:
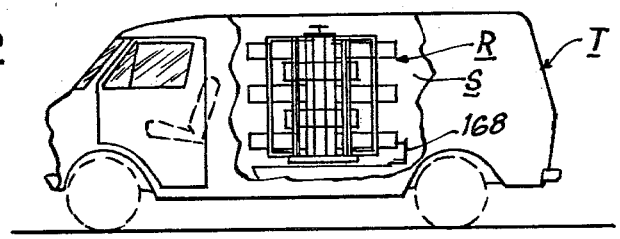
FIG. 2 is a side elevation of the van of FIG. 1, with parts of its side walls cut away to reveal certain interior equipment.

Referring first to FIGS. 1 and 2, my invention contemplates a specially equipped truck body T which may be the body of a standard or modified panel van designed to facilitate and expedite the functioning of servicemen, as outlined hereabove. It will be understood that my invention is otherwise applicable to the cabin of a nautical vessel, etc. In fact, various aspects of my invention are widely applicable, as in stationary installations, although specially designed for moving vehicles.

Truck body T comprises essentially two main compartments, viz., cab portion C and storage compartment S, said compartments being separated by a bulkhead B, preferably.

Removably mounted in the cab portion and storage compartment, respectively, are various storage and dispensing devices as will hereinafter be described.

Stationary Storage Devices

As seen in FIG. 1, available space within the storage portion S of the truck body is utilized by provision of stationary storage and dispensing units 160, 160 disposed adjacent the side walls and a unit 165 supported by the roof. All of said units are preferably of knockdown construction designed for easy mounting and detachment.

As seen in FIGS. 9-11, conveniently positioned adjacent a side wall is a frame 175 comprising legs L bolted to the floor, to which legs are attached transverse bars b defining the ends of the frame. Mounted on bars b is a pair of upstanding U-shaped wire members 178 secured to the roof as by straps 179 and spaced lengthwise of the truck.

Extending between the legs of each U-member 178 and fixed thereto as by brazing or welding is a series of vertically spaced horizontal container supports 180, preferably of wire. Said supports are provided with elements such as integral loops 182 for limiting movement of a basket 185, as hereinafter described in further detail.

The side containers may take a variety of forms. A preferred basket 188 formed of wire comprises a top rim element 191 having back and side members, the front being open. Wires secured to rim 191 form three sides and a bottom grid 193. A bail-like clamp 195 hingedly attached to the side portions of rim 191 clampingly engages support wires 180, cooperating with loops 182 to limit outward and rearward displacement of the basket.

The front of the basket is provided with a gate member 197 pivoted at the bottom to drop and retained in closed position by any suitable means, which may be similar to containers described and claimed in my parent applications noted hereabove.

A ceiling container 200 may also be provided, a preferred form of which is seen in FIGS. 9 and 12, formed of wire and having four sides and a bottom of lattice form. Basked 200 may be pivotally attached by a rear rim portion 205 to a suitable bracket 206 on the roof of the truck body, the basket front being detachably connected by a bail 210 or the like pivotally attached as at 212 to a support 215 fixed to the roof. Downward displacement of basket 200 is limited by a flexible member 216 (FIG. 9).

It will be understood that other types of storage and dispensing units may be provided, such as chests, cabinets, etc., in any case secured against displacement in truck transit and arranged for convenient access.

DOCUMENT-LITERATURE STORAGE

As seen in FIGS. 3-8, my invention includes special knockdown and readily detachable equipment in the cab portion C of the van body for storing and permitting ready access to a substantial volume of papers and literature and like material required by a serviceman in a day's operations, facilitating his work and adding to his efficiency.

Secured to the forward face of bulkhead B between seats S', S' (FIG. 1) for instant detachment is a box-like storage container 250 preferably, though not necessarily, formed of sheet material for housing ring binders, books such as catalogs and the like. Container 250 may have a plurality of compartments defined by vertical panels 255 and a front wall 256. A horizontal panel 260 forms a top closure for container 250 and extends forwardly thereof, with downwardly extending flanges 263.

Panel 260 is supported remotely from bulkhead B by a diagonal strut 270 which may conveniently by a U-shaped rod (FIGS. 3, 4) secured to the floor and to panel 260 for instant detachment. Such quick detachment means referred to herein may be the well known "trunk lock" 275 form of snap clamp or any other suitable device. The quick detachment elements 275, which may be, in effect, spring latches resembling "trunk lock", are clearly illustrated in FIGS. 7 and 8, when they are in engagement with the horizontal bars at the top and bottom of the rectangular strut 270, which abut the underside of the panel or table 260 and the floor, respectively. In addition, an element 275 is affixed to the outer end of each lateral flange 263 for engagement with a fixed element on the bulkhead adjacent thereto, as shown in FIGS. 3 to 6.

Disposed on panel 260 is a pair of stacked open-top trays or baskets 280, 280 of any suitable design for loose papers, preferably of wire and quickly detachable as by thumb-screws 285. A suitable bail or other suitable hold-down 287 prevents blowing away of loose papers.

Also arranged on panel 260 is means for supporting stacked sheets in fixed relation for ready access and punched for securement, such means comprising spaced upstanding wire U-members 290 (FIGS. 3, 5). Said wire members are detachably secured below the panel, resilient means 293 permitting their vertical movement for insertion or removal of papers.

It will be seen that I have provided in the cab literature storage means positioned for convenient use and adapted to be quickly set and instantly taken down to permit access to operating parts of the vehicle.

Conclusion

Various changes coming within the spirit of my invention may suggest themselves to those skilled in the art. Hence, I do not wish to be limited to the specific forms shown or uses mentioned, except to the extent indicated in the appended claims.

I claim:

1. In combination with a vehicle having a forward driver's compartment with a driver's seat on one side thereof, a rear compartment, and a bulkhead behind the driver's seat separating said compartments, document supporting means adjacent the driver's seat comprising
   (a) a table for supporting documentary material, said table having a free outer end and an inner end disposed adjacent said bulkhead, said table including a pair of lateral flanges on opposite sides thereof,
   (b) means for attaching said inner end of the table to said bulkhead comprising a sping latch affixed to the outer end of each flange for ready engagement with a cooperating fixed element on said bulkhead, and
   (c) a rearwardly directed diagonal strut having its upper end detachably connected to the underside of said table at the forward portion thereof remote from the bulkhead, and the lower end thereof detachably connected to the floor of said compartment.

2. In combination with a vehicle having a forward driver's compartment with a driver's seat on one side thereof, a rear compartment, and a bulkhead behind the driver's seat separating said compartments, document supporting means adjacent the driver's seat comprising
   (a) a table for supporting documentary material, said table having a free outer end and an inner end disposed adjacent said bulkhead,
   (b) means for attaching said inner end of the table to said bulkhead, and
   (c) a rearwardly directed diagonal strut having its upper end detachably connected to the underside of said table at the forward portion thereof remote from the bulkhead and the lower end thereof detachably connected to the floor of said compartment, said diagonal strut being formed of a rectangular wire frame terminating in horizontally disposed rods at opposite ends thereof, and spring clips on the underside of said table and on the floor for effecting the ready engagement of said respective rods.

3. The combination as set forth in claim 2, wherein document supporting shelf means is supported by and under said table and disposed between said strut and bulkhead.

* * * * *